United States Patent [19]
Cameron et al.

[11] Patent Number: 5,047,638
[45] Date of Patent: Sep. 10, 1991

[54] PASSIVE BORESIGHTING SYSTEM

[76] Inventors: Jeffery A. Cameron, 2808 Montrose Dr. SW., Decatur, Ala. 35601; Deborah L. Fraley, 119 Steele Dr., Madison, Ala. 35758

[21] Appl. No.: 372,678

[22] Filed: Jun. 28, 1989

[51] Int. Cl.$^5$ .............. G01B 11/26; G01B 11/27; G02B 23/06

[52] U.S. Cl. .............. 250/330; 250/467.1; 250/339; 250/341; 356/153; 356/138

[58] Field of Search ........... 250/330, 467.1, 339, 250/341; 356/153, 138; 350/172, 171

[56] References Cited

U.S. PATENT DOCUMENTS

| | | | |
|---|---|---|---|
| 3,518,005 | 6/1970 | Weber | 356/138 |
| 4,139,769 | 2/1979 | McCrum et al. | 250/341 |
| 4,168,429 | 9/1979 | Lough | 250/330 |
| 4,422,758 | 12/1983 | Godfrey et al. | 356/152 |
| 4,649,274 | 3/1987 | Hartman | 250/341 |
| 4,850,694 | 7/1989 | Severinsson et al. | 356/153 |
| 4,902,128 | 2/1990 | Siebecker et al. | 356/152 |

Primary Examiner—Constantine Hannaher
Assistant Examiner—Edward J. Glick
Attorney, Agent, or Firm—Phillips & Beumer

[57] ABSTRACT

A boresighting system including an optically pumped target member for correlating the boresight between a plurality of components such as a laser rangefinder/designator (LRF/D), a thermal imager such as a Forward Looking Infrared (FLIR) device, and a video system. The laser rangefinder is used as a reference with which to align the thermal imager and the video system. The target member and a visible source generator of the boresighting system provide multispectral capability without using any driving electronics. Both the target member and the visible source generator are located at the geometric focus of collimating optics used with the system, and, since, by definition, the geometric focus is equivalent to infinity, a point souce of radiation by the optically pumped target and the visible light generated by the visible source generator will appear to be extended sources from infinity.

17 Claims, 4 Drawing Sheets

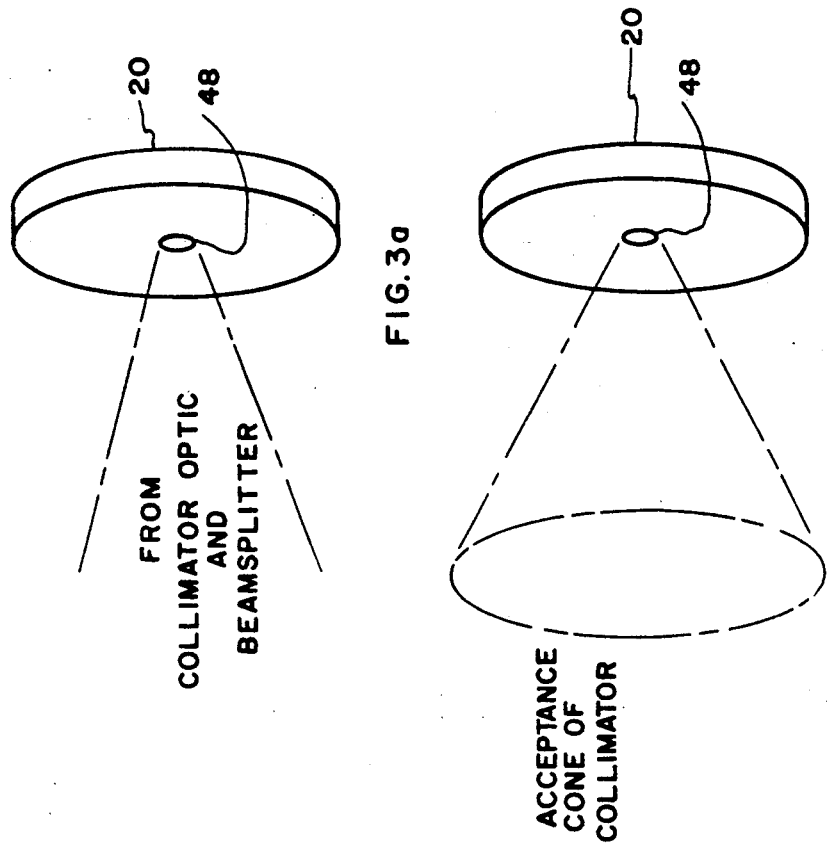
FIG. 3a
FIG. 3b
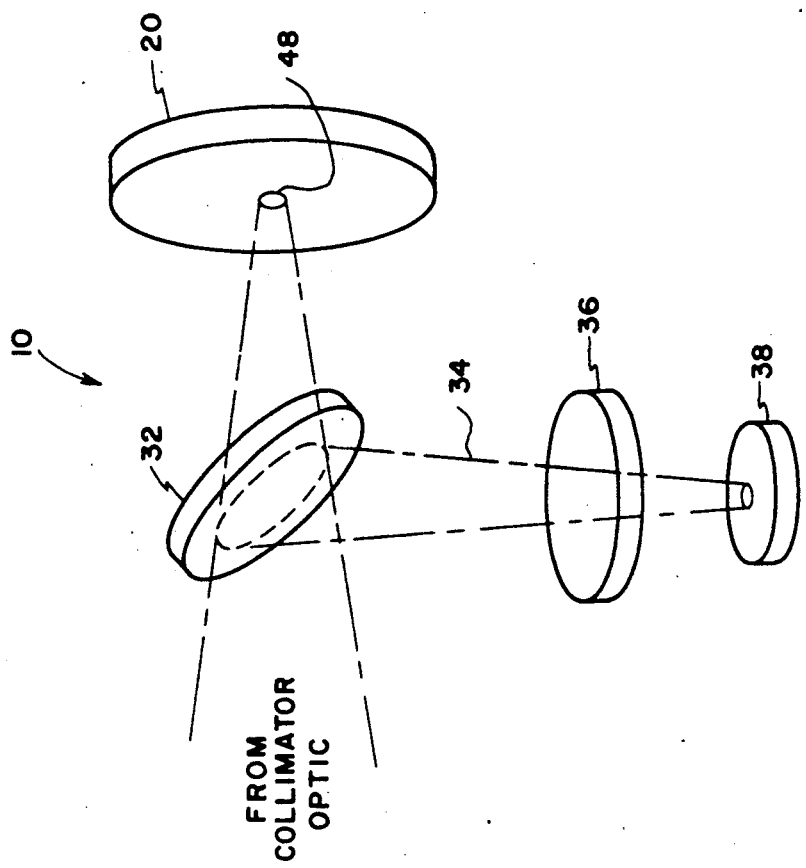
FIG. 2

PASSIVE BORESIGHTING SYSTEM

Field of the Invention

This invention relates generally to a boresighting system and more particularly to a passive boresighting system.

BACKGROUND OF THE INVENTION

In the early 1960s the only significant Electro-Optic (E-O) systems in use by the military were telescopic sights, television systems, and image intensifier systems. The invention of the laser in 1960 allowed laser rangefinder/designator systems to be integrated directly with imaging systems. Laser guided weapon systems were further enhanced by the introduction of TV-aided aiming systems on stabilized platforms. These were followed by thermal imagers, such as Forward Looking Infrared (FLIR) systems which achieved day/night capability.

Today's military arsenals contain FLIR and laser systems as standard pieces of equipment. The proliferation of FLIRs and lasers under armor, in attack and surveillance aircraft, aboard ship, with ground personnel, and so forth, has reached dramatic proportions. Improved guidance, accuracy, and maneuverability in weapons employing these systems has put increased demands on the platform, the sensors, and the operator. To help the user, autotrackers have been added in order to automatically track various targets. The introduction of such sophisticated and complex electro-optic technologies to the field has put increased and unique demands on the logistics support personnel and equipment. Commensurate with the hardware is the necessity to field the sophisticated maintenance support equipment required to keep this important capability on line and operating.

However, imaging systems in use today typically use electro-optic sensors on board a platform which must be fully functional and accurately boresighted with each other if the sensors are to be of any use. Any number of events, such as a nearby bomb blast, or even the constant mechanical vibration of the platform, can cause the sensors to fall out of alignment. Therefore, it is necessary to have a boresight test system that can be used any time the boresight accuracy of the sensors is in question.

The task of boresighting integrated sensors is never a simple one. Materials and techniques employed in the boresighting apparatus must be suited to the specific wavelength bands over which the sensors are expected to perform. The problem is particularly complex when a set of sensors combines electro-optic functions in widely disparate spectral bands. The combination of video (0.4 to 0.7 micrometers), FLIR (3 to 5 and 8 to 12 micrometers), and Nd:YAG laser rangefinder/designators (1.06 micrometers) places design constraints on the test equipment.

It is an object of the present invention, therefore, to provide a system which will permit accurate and rapid boresighting of a plurality of discrete components.

It is another object of the present invention to provide such a boresighting system which is passive in nature.

It is still another object of the present invention to provide such a system with a member which is optically pumped for stimulated emission of radiation to provide the target for the boresighting operation.

It is a further object of the present invention to provide such a system which is operable simultaneously in discrete spectral bands.

SUMMARY OF THE INVENTION

A boresighting system for boresighting a plurality of components. The system includes a laser having an output laser beam which is used to optically pump a target member to generate a point source of radiation therefrom to which the components are boresighted. Collimating optics are used to collimate the output beam and the emitted radiation from the target. Additionally, the components may be operable in discrete spectral bands including infrared and visible bands, in which case a visible source generator is provided which converts a portion of the output infrared laser beam to visible radiation which may be observed by a component or components operable in the visible region of the spectrum, such as TV systems or other viewing optics and used as a target to boresight the TV system. Another portion of the infrared laser beam is simultaneously directed to a target member and optically pumps the target member for point source emission of radiation in the infrared which is used as the target for boresighting the infrared component or components.

BRIEF DESCRIPTION OF THE DRAWINGS

FIG. 2 is an enlarged view of the optical components which are utilized to convert a non-visible laser output into visible radiation.

FIGS. 3a and 3b illustrated the target receptor material and the collimator aperture.

DESCRIPTION OF THE PREFERRED EMBODIMENTS

Figure 1:
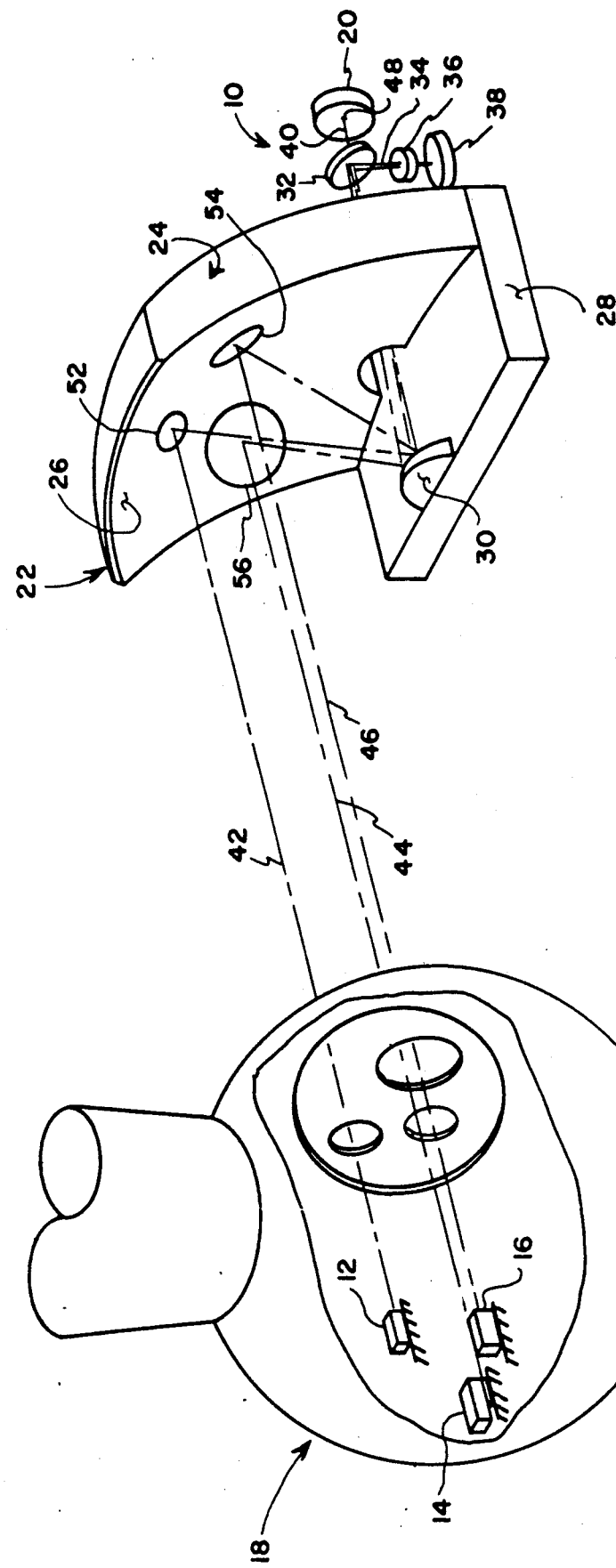
FIG. 1 is a pictorial diagrammatic view of a boresighting system of the present invention and illustrates a laser and other components to be boresighted.

As seen in FIG. 1, a boresighting system 10 is provided for boresighting a plurality of components 12, 14, and 16 mounted on a platform, such as pod 18, which is adapted to be mounted on a transport device. Component 12 is a laser, such as but not limited to, a laser rangefinder/designator (LRF/D) comprised of a Nd:YAG laser. Component 14 is a thermal imaging device such as a FLIR (Forward Looking Infrared) device. Component 16 is a video system which may include a TV camera. Each of the above-identified components are well known in the art. The laser rangefinder/designator is used as the boresight reference for the FLIR and the video system and is also mechanically referenced to sensor platform 18.

System 10 is shown to include a target receptor member 20 disposed in spaced relation with components 12, 14, and 16, a collimating optics system 22 comprised of a mirror assembly 24 having a curved polished surface 26 and a base portion 28 having a secondary optic 30 mounted thereon. A beam splitter 32 is positioned between target member 20 and collimating optics 22. Beam splitter 32 passes a portion 34 of the output laser beam to a frequency modifer 36 and then onto a diffuser plate 38. Another portion 40 of the laser beam passes through the beam splitter and is directed to target member 20.

In the operation of this embodiment, the output of the Nd:YAG laser rangefinder/designator is 1.06 micrometer, the FLIR observes radiation of 3 to 5 and 8 to 12 micrometers, and the view optics comprised of a TV and related optics view radiation of 0.4 to 0.7 micrometers.

FIG. 1 illustrates the lines of sight 42, 44, and 46 of laser 12, FLIR 14, and TV system 16. The laser output beam is also indicated by the numeral 42. As can be seen in this figure, laser output beam 42 is reflected off surface 26 of mirror 24 and onto secondary optic 30 which then directs the beam to beam splitter 32 which directs a portion 34 of the beam to frequency modifier 36 (which, in this case, is a frequency doubler) which doubles the frequency (halves the wavelength) so that the infrared beam portion 34 is converted into visible radiation which is directed to diffuser plate 38 which then scatters the visible radiation into a $2\pi$ hemisphere. A portion of the scattered radiation is intercepted in the collimating system and is projected out of the collimating system as a collimated beam. The video system (or the naked eye of an operator) observes a visible image of the focused output of the laser rangefinder/designator as it passes through the frequency doubling material and strikes the surface of the diffusing plate. The video system observes the centroid of the output of the laser rangefinder/designator. Any boresight errors observed by the video system are corrected by adjusting the azimuth and elevation of the video system either mechanically or electronically.

Portion 40 of the laser beam from the rangefinder/designator is directed to a point 48 of target member 20 which absorbs the incident output from the laser rangefinder/designator. In doing so, the target material is optically pumped, thus raising the atoms in the material to a higher energy state. The atoms then relax down to a lower energy state which is metastable. This energy state has a relatively long lifetime and decays to ground state, thus emitting radiation in the 8 to 12 micrometer spectrum. The 8 to 12 micrometer radiation is emitted into a $2\pi$ hemisphere from the point source 48. Some of the radiation is intercepted by the collimator optic and is projected out of the boresight device as a collimated beam. The FLIR observes an 8 to 12 micrometer image of the focused output of the laser rangefinder/designator on target 20. Thus, the FLIR observes the centroid of the output of the laser rangefinder/designator. Any boresight errors observed by the FLIR are corrected by adjusting the azimuth and elevation of the FLIR either electronically or mechanically.

It is to be understood that the boresighting system including the collimating optics disclosed is illustrated herein as being positioned externally of the pod 18 and as a large aperture system. However, if desired, the boresight system may be made very small and integrated internally into the sensor platform or pod. It is to be also understood that the circles 52, 54, and 56 shown on surface 26 of the collimating optics in FIG. 1 are used merely to indicate the apertures of components 12, 14, and 16, respectively.

Furthermore, it should be understood that the target material 20 is made of a material that can be optically pumped by a laser source. Such materials include all optical grade substrates which can be doped with a material that absorbs laser radiation and re-emits radiation due to spontaneous emission, stimulated emission, or nonradiative decay. An example of these materials are solid state laser materials (such as, but not limited to, ruby); attenuation filters (such as, but not limited to, Schott glass filters); plastics doped with organic dyes (such as, but not limited to, Rhodamine 6G); and other related materials.

FIG. 2 is an enlarged view of the visible source generator portion and target member 20 of the system shown in FIG. 1. The visible source generator portion of the system uses the frequency doubling material 36 to generate visible radiation. The frequency doublers belong to a class of solid state crystals which interacts with the incoming output from a laser source in such a way as to generate radiation which has a frequency that is twice the frequency of the laser source, or which amounts to the same thing, half of the wavelength. So if an incoming laser beam were in the near infrared, the visible source generator portion of the system would generate blue-green radiation, which is the visible spectrum. This visible radiation would then illuminate a diffuser member. An example of the frequency doubling crystals are, but not limited to, KDP (Potassium Dihydrogen Phosphate); ADP (Ammonium Dihydrogen Phosphate); $LiNo_3$ (Lithium Niobate); and such related materials. An example of a diffuser would be any material that could be prepared such that the surface of the material would act as a Lambertian radiator. Such materials are well known in the art.

Figure 4A:
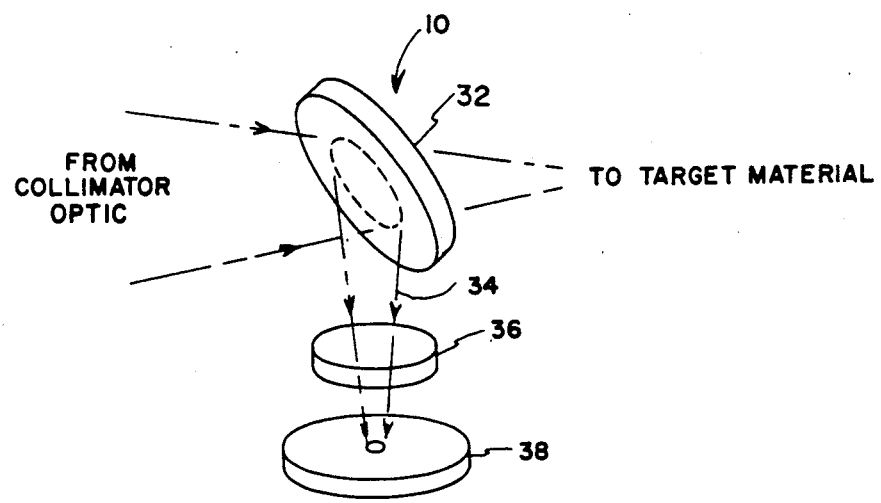
FIGS. 4a and 4b are views similar to FIGS. 3a and 3b and respectively illustrate the incoming and re-emitted paths of radiation through the wavelength modifying portion of the system.
Figure 4B:
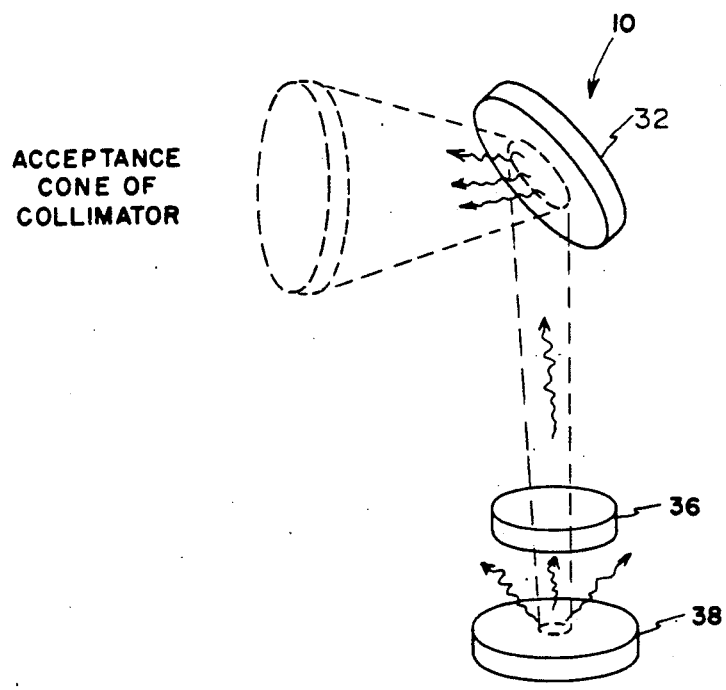

FIGS. 3a and 3b illustrate the target member and acceptance cone and emittance cone therefor. FIGS. 4a and 4b illustrate the functional characteristics of the visible source generator portion of the boresight system.

Figure 5:
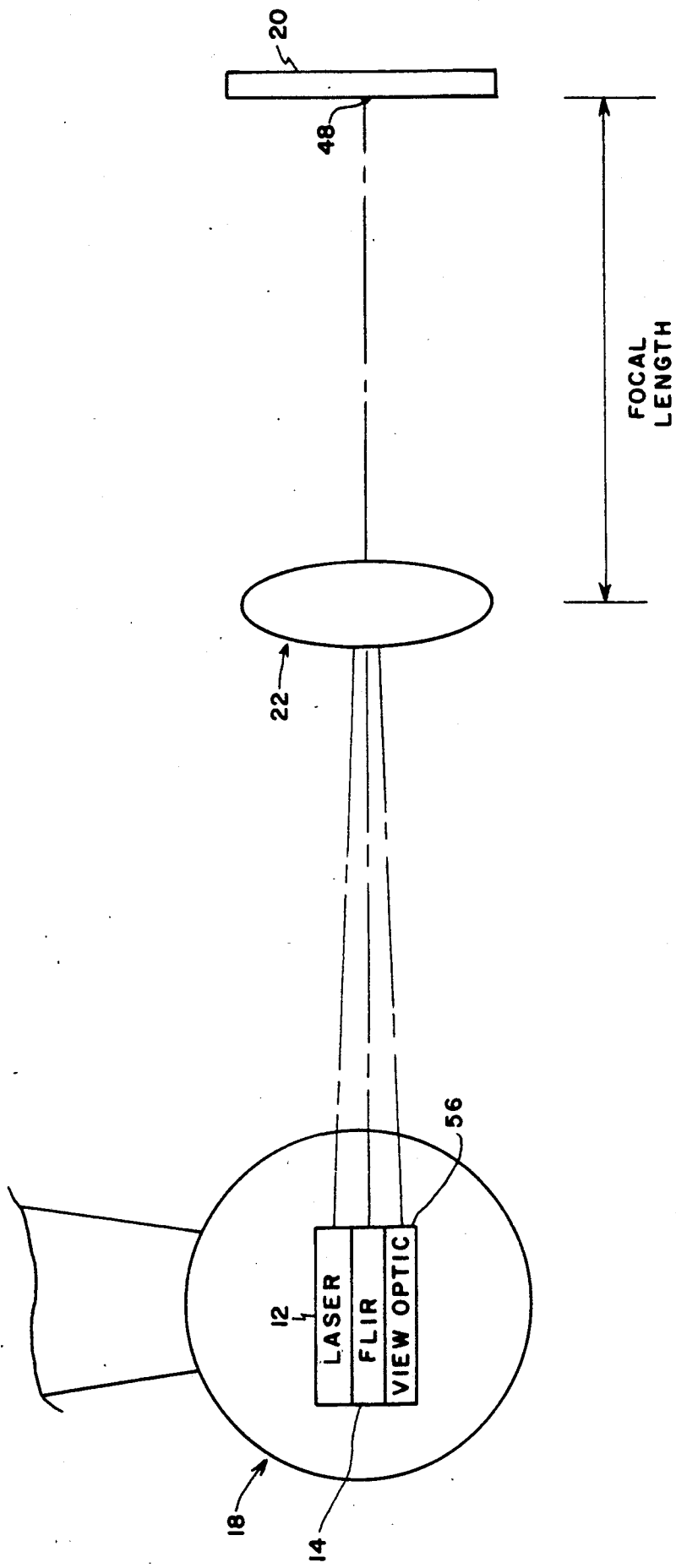
FIG. 5 is a diagrammatic pictorial view of another embodiment of the present invention.

FIG. 5 is a diagrammatic view illustrating an embodiment of the present invention which does not require conversion of any radiation into visible radiation.

In this embodiment, wherein like numerals refer to like parts, infrared laser 12, thermal imaging device (FLIR) 14, and a viewing optic 56 which scans in the infrared is used. One such viewing optic would be a standard silicon base camera. In this embodiment, components 12, 14, and 56 are mounted internally of support 18 or externally as shown in FIG. 5. The laser output beam impinges on the target to generate a point source of radiation emanating from point 48 of target 20 in the manner described previously, and the components are adjusted (boresighted) to the point source either mechanically or electronically. The target member is located at the geometric focus of the collimating lens 22.

It is to be understood that the boresighting system described herein is a passive system and that no power supplies are required to activate the boresight device. Additionally, the field of view of the boresighting system is large enough to accommodate large errors in the initial mechanical alignment.

Although the invention has been described with respect to its preferred embodiments, it is to be understood that many variations and modifications will now be obvious to those skilled in the art, and it is preferred, therefore, that the scope of the invention be limited only by the following claims.

We claim:

1. A passive boresighting system including a laser for boresighting a plurality of components to a target, said plurality of components including at least a thermal imager and an optical system operable in the visible portion of the electromagnetic spectrum, said boresighting system comprising:

support means for supporting said laser and said plurality of components;

a target arranged in spaced relation with said plurality of components and disposed for impingement by the output laser beam from said laser, said target disposed for energization by said laser beam to emit a point source of radiation at a predetermined wavelength;

a collimator disposed intermediate said target and said plurality of components, said target positioned at the geometric focal point of said collimating means;

visible source generator means disposed between said collimating means and said target for converting a portion of the output laser beam of said laser into visible radiation; and means for redirecting said visible radiation back through said collimating means for superimposed relation with said point source of radiation from said target.

2. A boresighting system as set forth in claim 1 wherein said collimating means is a lens.

3. A boresighting system as set forth in claim 1 wherein said visible source generator means includes frequency modifying means disposed to receive a first portion of said infrared beam from said laser and for changing the frequency of said first portion of said infrared beam and thus the wavelength thereof into the visible wavelength portion of the electromagnetic spectrum.

4. A boresighting system as set forth in claim 3 including a beam splitter positioned intermediate said target and said collimating means for directing a second portion of said laser beam to said target while directing said first portion to said frequency modifying means.

5. A boresighting system as set forth in claim 4 wherein said frequency modifying means is a frequency doubler.

6. A boresighting system as set forth in claim 5 including a diffuser plate mounted adjacent said frequency doubler for directing said first portion of said laser beam back to said collimating means.

7. A boresighting system as set forth in claim 6 wherein said receptor member is comprised of an optical substrate material disposed for emission of radiation responsive to stimulated emission, spontaneous emission, or nonradiative decay.

8. A boresighting system as set forth in claim 7 wherein said substrate material is ruby.

9. A boresighting system as set forth in claim 7 wherein said substrate material is comprised of an attenuation filter material.

10. A boresighting system as set forth in claim 9 wherein said attenuation filter material is a Schott glass filter.

11. A boresighting system as set forth in claim 7 wherein said frequency doubler is a frequency doubler crystal comprising potassium dihydrogen phosphate.

12. A boresighting system as set forth in claim 7 wherein said frequency doubler is a frequency doubler crystal comprising ammonium dihydrogen phosphate.

13. A boresighting system as set forth in claim 7 wherein said frequency doubler is a frequency doubler crystal comprising lithium niobate.

14. A boresighting system as set forth in claim 7 wherein said optical system is a TV video system.

15. A boresighting system as set forth in claim 7 wherein said collimating means is a mirror assembly comprising a member having a base provided with an upstanding curved reflective focusing surface forming a primary optic and a second reflective focusing surface forming a secondary optic mounted on said base for receiving reflected radiation from said primary object and for directing said radiation to a predetermined position.

16. A passive boresighting system including a laser for boresighting a plurality of components to a target, said plurality of components including at least a thermal imager and an optical system operable in the visible portion of the electromagnetic spectrum, said boresighting system comprising:

a target arranged in spaced relation with said plurality of components and disposed for impingement by a first portion of the output beam of said laser to emit a point source of radiation at a predetermined wavelength;

a collimator disposed intermediate said target and said plurality of components, said target positioned at the geometric focal point of said collimator for forming a focal plane;

beam splitter means disposed between said laser source and said target for directing said first portion of said laser output beam to said target and for directing a second portion of said laser output beam away from said target;

a visible light generator disposed in spaced relation with said beam splitter means downstream of said focal plane for receiving said second portion of said laser output beam for conversion thereof into visible light; and diffuser means disposed in spaced relation with said visible light generator for receiving said visible light therefrom and for directing said visible light received from said light source generator back into said collimator for creating a point source of visible radiation for superimposed relation with said point source of radiating emanating from said target.

17. A passive boresighting system including a laser for boresighting a plurality of components to a target, said plurality of components including at least a thermal imager and an optical system operable in the visible portion of the electromagnetic spectrum, said boresighting system comprising:

a target arranged in spaced relation with said plurality of components and disposed for impingement by the output laser beam from said laser, said target comprised of an optical substrate material disposed for emission of radiation responsive to stimulated emission, spontaneous emission, or nonradiative decay for creation of a point source for boresighting said plurality of components thereof.

* * * * *